(12) United States Patent
Xu et al.

(10) Patent No.: US 11,506,851 B1
(45) Date of Patent: Nov. 22, 2022

(54) CABLES HAVING BUFFER ELEMENTS FORMED WITH TWO-DIMENSIONAL FILLERS

(71) Applicant: Superior Essex International LP, Atlanta, GA (US)

(72) Inventors: Bo Xu, Alpharetta, GA (US); Christopher W. McNutt, Woodstock, GA (US)

(73) Assignee: Superior Essex International Inc., Atlanta, GA (US)

( * ) Notice: Subject to any disclaimer, the term of this patent is extended or adjusted under 35 U.S.C. 154(b) by 251 days.

(21) Appl. No.: 16/738,031

(22) Filed: Jan. 9, 2020

(51) Int. Cl.
    *H01B 7/18* (2006.01)
    *G02B 6/44* (2006.01)

(52) U.S. Cl.
    CPC ........... *G02B 6/443* (2013.01); *H01B 7/1875* (2013.01)

(58) Field of Classification Search
    CPC ..................................................... H01B 7/1875
    See application file for complete search history.

(56) References Cited

U.S. PATENT DOCUMENTS

| | | | | |
|---|---|---|---|---|
| 6,430,344 | B1 * | 8/2002 | Dixon .................... | G02B 6/443 385/113 |
| 2005/0058412 | A1 * | 3/2005 | Mumm ................ | G02B 6/4429 385/100 |
| 2005/0175834 | A1 * | 8/2005 | Maritano ............... | H01B 3/446 428/364 |
| 2022/0057593 | A1 * | 2/2022 | Abernathy ........... | G02B 6/4432 |

FOREIGN PATENT DOCUMENTS

| | | | | |
|---|---|---|---|---|
| WO | WO-03056576 | A1 * | 7/2003 | ........... C08K 5/0016 |
| WO | WO-2015191391 | A1 * | 12/2015 | ........... G02B 6/4432 |

\* cited by examiner

*Primary Examiner* — Kaveh C Kianni

(57) ABSTRACT

Cables having buffer elements formed with two-dimensional fillers are described. A cable may include at least one optical fiber, and a buffer element may be formed around the at least one optical fiber. The buffer element may be formed from a material that includes a polypropylene-containing polymeric resin, a filler added to the polymeric resin that includes a plurality of two-dimensional particles, and an amphiphilic compatabilizer. A jacket may be formed around the at least one optical fiber and the buffer element.

10 Claims, 7 Drawing Sheets

CABLES HAVING BUFFER ELEMENTS FORMED WITH TWO-DIMENSIONAL FILLERS

TECHNICAL FIELD

Embodiments of the disclosure relate generally to optical fiber cables and, more particularly, to optical fiber cables having buffer elements that are formed from a polymeric resin filled with two-dimensional particles.

BACKGROUND

Optical fiber cables and hybrid cables that include optical fibers are utilized in a wide variety of applications to transmit data and other signals. In order to protect relatively fragile and sensitive optical fibers, the fibers are typically housed within one or more suitable buffer elements. For example, optical fibers may be housed within one or more buffer tubes. As another example, tight-buffer layers may be formed around one or more optical fibers. Traditionally, optical fiber buffer elements have been made from materials such as polybutylene terephthalate ("PBT"), polycarbonate ("PC"), or a polyamide such as Nylon-12. Although these materials provide good mechanical protection to the fibers, they are typically more costly, less flexible, and more difficult to handle and process than other polymeric materials, such as polypropylene ("PP") and polyethylene ("PE"). These conventional materials are also more susceptible to moisture, which can lead to fiber attenuation.

More recently, buffer layers have been formed from PP, PE, and PP-PE copolymers that have been nucleated with talc, silica, or another inorganic material as a nucleating agent. Although the nucleation process provides improved compress-tension resistance and shrinkage performance over non-nucleated materials, buffer layers formed from conventional nucleated materials often undergo post-extrusion shrinkage that can lead to an increase in excess fiber length causing signal attenuation. The formation of buffer layers from conventional nucleated materials also involves a relatively inefficient manufacturing process having slow operating line speeds. Accordingly, there is an opportunity for improved buffer layers that provide enhanced mechanical performance and offer faster processing speeds. In particular, there is an opportunity for cables having buffer elements formed from polymeric materials that are filled with two-dimensional particles.

U.S. Pat. No. 6,430,344 to Dixon et al describes buffer tubes that are formed from a polymeric resin filled with high aspect ratio clay fillers. The high aspect ratio fillers have a diameter that is much greater than their thickness (described as between 100 and 1500). Additionally, the fillers are described as being subjected to a surface treatment prior to incorporation into a polymeric resin. However, surface treatment is often not efficient enough to exfoliate and disperse the fillers into a polyolefin matrix without polar functional groups or chain segments. As a result, the effectiveness of the fillers may be largely limited. As such, there is an opportunity for improved buffer elements including two-dimensional fillers that are effectively exfoliated and well dispersed within a polymeric resin. In particular, there is an opportunity for improved cables having buffer elements formed from polymeric materials blended with two-dimensional fillers and polymeric compatabilizers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
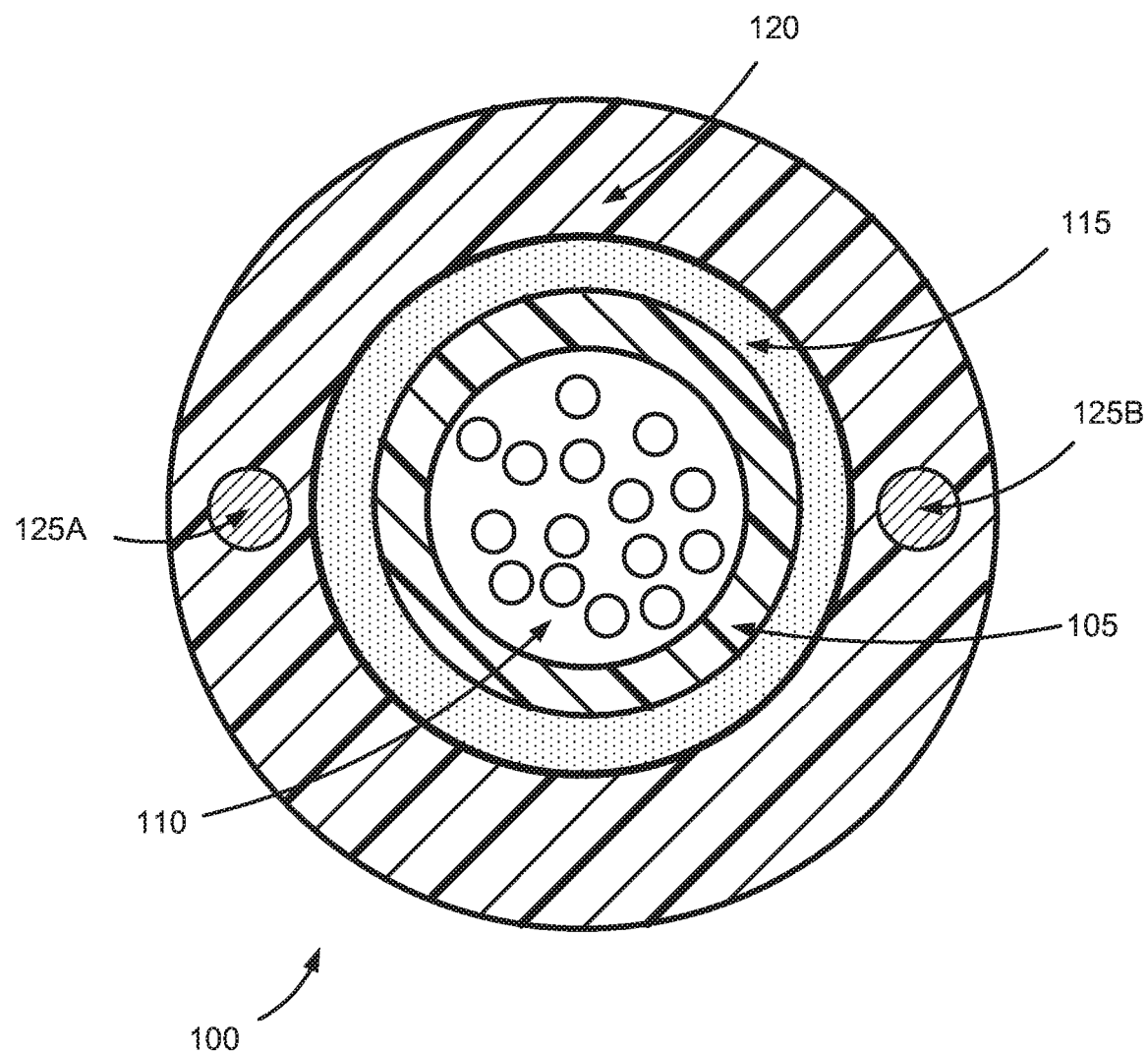
FIGS. 1-4 are cross-sectional views of example cables incorporating one or more buffer layers formed at least in part from a polymeric material filled with two-dimensional particles, according to illustrative embodiments of the disclosure.

Various embodiments of the present disclosure are directed to optical fiber cables that include one or more buffer elements formed at least in part from a polymeric resin filled with a plurality of two-dimensional particles. A cable may include at least one optical fiber, and a buffer element may be formed around the at least one optical fiber. For example, a tight-buffer layer, buffer tube (e.g., a loose tube, etc.), or a microtube may be formed around the at least one fiber. The cable may additionally include a jacket formed around the at least one optical fiber and the buffer element.

According to an aspect of the disclosure, the buffer layer may be formed from or include one or more layers formed from a material that includes a polymeric resin, a filler added to the polymeric resin, and a compatabilizer combined with the polymeric resin and the filler. A wide variety of suitable polymeric resins may be utilized as desired, such as polypropylene ("PP"), a polypropylene copolymer (e.g., a copolymer of polypropylene and polyethylene ("PE"), etc.), or another suitable polyolefin resin or polyolefin-containing resin. Additionally, in certain embodiments, the polymeric resin may be a nucleated polymeric resin.

Additionally, according to an aspect of the disclosure, a plurality of two-dimensional particles may be added as a filler to the polymeric resin. For purposes of this disclosure, the term "two-dimensional particle" means a particle having a very small or negligible thickness compared to its surface area, diameter, length or other dimension(s) taken along a line or in a plane that is perpendicular to the thickness. In certain embodiments, two-dimensional particles may have an aspect ratio "a" between a dimensional line taken along its surface area "D" relative to is thickness "T" in a dimension perpendicular to the surface area (i.e., a=D/T), and the value of "a" may be greater than 10. For example, the value of "a" may be at least 10, 25, 50, 75, 100, 200, 300, 400, 500, 600, 700, 800, 900, 1,000, 1,250, 1,500 or greater. A wide variety of dimensional lines "D" taken along a surface area of a two-dimensional particle may be utilized, such as a length, diameter, width, etc. In other words, the two-dimensional particles utilized as fillers may be relatively long and/or wide particles relative to their thicknesses. Additionally, two-dimensional particles may have single or multiple layers. For example, the two-dimensional particles may be layered particles having a plurality of layers that may separate or exfoliate when incorporated into a buffer layer. Additionally, when incorporated into a buffer element, the two-dimensional particles may be oriented along a longitudinal direction of the buffer element. For example, a longer dimension of a two-dimensional particle (e.g., a length along line "D", etc.) may be oriented or approximately aligned with a longitudinal direction of the buffer element.

A wide variety of suitable two-dimensional particles may be utilized as desired in various embodiments. Examples of two-dimensional particles include, but are not limited to, layered silicates (e.g., montmorllonite, hectrorite, saponite, vermiculite, kaolinite, mica, talc, etc., which can be either synthetic minerals, natural minerals, or combinations thereof), exfoliated silicate platelets, graphite oxide, double hydroxide (LDH) tactoids, metal oxide nanosheets, carbon nanowalls, etc. In certain embodiments, the two-dimensional particles may be utilized solely as a filler material. In other embodiments, the two-dimensional particles may be mixed or blended at any suitable ratio with one or more other filler materials or filler components including, but not limited to, components in the shape of tubes, components in the shape of fibers, components having spherical shapes, and/or components having cubical shapes. Examples of other filler components include, but are not limited to, carbon nanotubes, cellulose whiskers, boron nitride tubes, gold nanotubes, gold nanowires, silver nanotubes, two-dimensional graphene, graphene, black phosphorus, clay nanotubes, natural sepiolite clay fibers, cellulose fibers, nanotubes, sisal fibers, carbon fibers, silver, zinc oxide, titanium dioxide, silica dioxide, iron oxide, cerium dioxide, copper oxide, molybdenum disulfide, hexagonal boron nitride, graphene oxide, nanosilica, nanoalumina, nanotitanium oxide, polyhedral oligomeric silsesquioxane (POSS), nanomagnesium hydroxide, semiconductor nanoclusters, carbon black, silicon carbide, silica, quantum dots (QDs).

Additionally, two-dimensional particles may be added as a filler to a polymeric resin in any suitable filling ratio. For example, two-dimensional particles may be incorporated into a buffer layer between approximately 0.01 percent and approximately 50 percent by weight. In various embodiments, the two-dimensional particles may be used as a filler at approximately 0.01, 0.05, 0.1, 0.2, 0.25, 0.5, 0.75, 1.0, 1.5, 2.0, 2.5, 3.0, 4.0, 5.0, 7.5, 10, 12.5, 15, 20, 25, 30, 35, 40, or 50 percent by weight of a buffer layer, at a percentage incorporated into a range by any two of the above values, or at a percentage incorporated into a range bounded on either a minimum or maximum end by one of the above values. In certain embodiments, the two-dimensional particles may form between approximately 0.5 percent and approximately 5.0 percent by weight of a buffer layer.

According to an aspect of the disclosure, one or more compatabilizers may additionally be included within a buffer element. For example, one or more functional compatabilizers may be utilized to improve the affinity between the surface of the two-dimensional filler material(s) and the polymeric resin. The compatabilizers may assist in intercalating and/or exfoliating layered two-dimensional particles incorporated into a polymeric resin. The compatabilizers may also facilitate dispersion of the two-dimensional particles within a polymeric matrix of the polymeric resin and improve interfacing between the two-dimensional particles and the polymeric resin. A wide variety of suitable compatabilizers and/or combinations of compatabilizers may be utilized as desired in various embodiments. Suitable compatabilizers include amphiphilic or amphipathic polymers, such as polypropylene-grafted maleic anhydride ("PP-g-MA"), polyethylene-grafted maleic anhydride ("PE-g-MA"), and/or compatabilizers that may chemically functionalize a polymer matrix with polar groups or segments on the polymer chains.

Examples of suitable compatabilizers include, but are not limited to, polypropylene modified by maleic anhydride (e.g., Sanyo PPMA sold by Sanyo Chemical Industries, Ltd.), functionalized polypropylene (e.g., PPOH, etc.), Hoeschst Hostaprime, Eastman Epolene® (e.g., low molecular weight PE, low molecular weight PP, etc.) sold by the Eastman Chemical Company, Eastman G particles that include maleic anhydride grafted PP or other polymers (e.g., Eastman G-3015, Eastman G-3003, etc. sold by the Eastman Chemical Company), Chemtura or Crompton-Uniroyal Chemical Polybond™ materials (e.g., Polybond 300, Polybond 3150, chemically modified polyolefins, etc.), DuPont Dow Fusabond® materials (e.g., Fusabond A560, E100, E158, E226, E265, E528, M603, N493, N525, N598, etc.) sold by the DuPont Company, Exxonmobil Exxelor™ PO materials (e.g., Exxelor PO 1020, etc.) sold by Exxonmobil, Linxidan® LX materials (e.g., Linxidan LX4433, LX4435, LX4436, LX4510, LX4520, LX4530, etc.) sold by Sacio AEI Polymers, Kraton™ FG materials sold by the Kraton Corporation, Integrate™ functionalized polyolefins sold by LyondellBassell, etc. Additionally, one or more compatabilizers may be added to a polymeric resin in any suitable filling ratio. For example, compatabilizer may be incorporated into a buffer layer between approximately 0.01 percent and approximately 80 percent by weight. In various embodiments, compatabilizer may be incorporated at approximately 0.01, 0.05, 0.1, 0.2, 0.25, 0.5, 0.75, 1.0, 1.5, 2.0, 2.5, 3.0, 4.0, 5.0, 7.5, 10, 12.5, 15, 20, 25, 30, 35, 40, 50, 60, 70, 75, or 80 percent by weight of a buffer layer, at a percentage incorporated into a range by any two of the above values, or at a percentage incorporated into a range bounded on either a minimum or maximum end by one of the above values. In certain embodiments, the compatabilizer may form between approximately 0.5 percent and approximately 10.0 percent by weight of a buffer layer. Additionally, any suitable weight ratio may be utilized between two-dimensional filler particles and the compatabilizer, such as a ratio of 0.01 to 10,000, 0.1 to 5,000, 0.1 to 1,000, 0.1 to 500, 0.1 to 100, 0.1 to 50, 0.1 to 10, 1 to 10, 1 to 5, or any ratio included in a range between any two of the above ratios. In certain embodiments, at least two or at least three times as much compatabilizer may be incorporated into a buffer layer by weight as compared to the two-dimensional filler particles.

As a result of incorporating two-dimensional particles into a buffer layer (e.g., buffer tube, tight-buffer layer, etc.), the physical and/or mechanical properties of the buffer layer may be improved. For example, the buffer layer may exhibit reduced post-extrusion shrinkage and may have improved compression, tension, and/or crush resistance. In particular, the addition of two-dimensional particles may improve the flexural modulus and/or the yield strength of a buffer layer. As a result, the buffer layer may facilitate improved excess fiber length ("EFL") control. The addition of two-dimensional particles may also improve the ability to process and extrude certain polymeric materials (e.g., PP, PE, PP-PE copolymer, etc.), thereby allowing enhanced operating line speeds. Additionally, the compatabilizer may facilitate improved dispersion and/or bonding of the two-dimensional particles within a polymeric resin, further enhancing the benefits of the two-dimensional particles.

Certain example embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1-4 are cross-sectional views of example cable constructions that incorporate one or more buffer layers formed at least in part from a polymeric material or polymeric resin filled with two-dimensional particles, according to illustrative embodiments of the disclosure. The described cables are provided by way of non-limiting example only, and it will be appreciated that a wide variety of other suitable optical fiber and/or hybrid cable constructions that include one or more optical fiber buffer layers may be formed in addition to those described.

Turning now to FIG. 1, a cross-sectional view of an example optical fiber cable 100 is illustrated. The illustrated cable 100 may have a single buffer tube 105 that serves as a buffer layer, and any number of optical fibers 110 may be disposed within the buffer tube 105. In certain embodiments, a water blocking layer 115 and/or a strength layer may be formed around the buffer tube 105. An outer jacket 120 may then be formed around the internal components of the cable 100. As desired, other cable designs, such as the cable illustrated in FIG. 2, may include a plurality of buffer tubes as well as any number of other cable components.

The buffer tube 105 may be situated within a cable core defined by the outer jacket 120, and the buffer tube 105 may be configured to contain or house optical fibers, such as the illustrated optical fibers 110. Additionally, in certain embodiments, the buffer tube may be formed from one or more polymeric materials filled with two-dimensional particles. In other words, the buffer tube 105 may be a buffer layer formed from a polymeric resin that has been blended or combined with two-dimensional filler particles and one or more compatabilizers. As explained in greater detail below, various polymeric resins, filler materials, and/or compatabilizers may be used in the formation of the buffer tube 105. Additionally, as explained in greater detail below with reference to FIGS. 5A-5B, the buffer tube 105 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins. As another example, a first layer may be formed from a polymeric resin filled with two-dimensional particles, and a second layer may be formed from a polymeric resin (e.g., the same polymer or a different polymer) without two-dimensional particles or filled with a different material. As another example, a flame retarding or other suitable additive may be incorporated into a first layer but not into a second layer. Further, the buffer tube 105 may have any suitable inner and/or outer diameters as desired in various applications.

Any number of optical fibers, other transmission elements, and/or other components may be positioned within the buffer tube 105. In certain embodiments, optical fibers may be loosely positioned in a tube, wrapped or bundled together, or provided in one or more ribbons (e.g., ribbons formed w/an acrylate coating, rollable ribbons, etc.) and/or ribbon stacks. FIG. 1 illustrates loose optical fibers 110 positioned in the buffer tube 105. In certain embodiments, a water-blocking filling compound (e.g., a water blocking gel, grease, etc.) may also be provided within the buffer tube 105. Alternatively, a buffer tube may be filled with a gas (e.g., air, etc.), powder, a moisture absorbing material, a water-swellable substance, dry filling compound, or foam material, for example in interstitial spaces between the optical fibers 110.

Each optical fiber 110 utilized in the cable 100 may be a single mode fiber, multi-mode fiber, multi-core fiber, or some other optical waveguide that carries data optically. Additionally, each optical fiber may be configured to carry data at any desired wavelength (e.g., 1310 nm, 1550 nm, etc.) and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness.

The outer jacket 120 may defines an outer periphery of the cable 100. The jacket 120 may enclose the internal components of the cable 100, seal the cable 100 from the environment, and provide strength and structural support. The jacket 120 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, cholorosulphonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the jacket 120 may include flame retardant materials, smoke suppressant materials, carbon black or other suitable material for protection against exposure to ultraviolet ("UV") light, and/or other suitable additives. The jacket 120 may include a single layer or, alternatively, multiple layers of material (i.e., multiple layers of the same material, multiple layers of different materials, etc.). As desired, the jacket 120 may be characterized as an outer sheath, a casing, a circumferential cover, or a shell.

The jacket 120 may enclose one or more openings in which other components of the cable 100 are disposed. At least one opening enclosed by the jacket 120 may be referred to as a cable core, and any number of other cable components may be disposed in a cable core. In the cable 100 illustrated in FIG. 1, the buffer tube 105 and water swellable materials 115 are situated within a cable core. A wide variety of other components may be situated within a cable core as desired, such as other transmission media, various separators or dividers, spacers, inner jackets or wraps, etc. Indeed, a wide variety of different cable constructions may be utilized in accordance with various embodiments of the disclosure.

Additionally, the illustrated cable 100 has a circular or approximately circular cross-sectional profile. In other embodiments, other cross-sectional profiles (e.g., an elliptical or oval profile, etc.) and/or dimensions may be utilized as desired. In other words, the jacket 120 may be formed to result in any desired shape. The jacket 120 may also have a wide variety of dimensions, such as any suitable or desirable outer diameter and/or any suitable or desirable wall thickness. Additionally, in certain embodiments, the cable profile may be formed to facilitate a specific function and/or to facilitate installation of the cable. For example, a cable profile may facilitate duct or conduit installation, and the cable 100 may be designed to withstand a specified installation tensile loading and/or other suitable design parameters.

In certain embodiments, at least one "ripcord" may be incorporated into the cable 100, for example, within a cable core. A ripcord may facilitate separating the jacket 120 from other components of the cable 100. In other words, the ripcord may help open the cable 100 for installation or field service. A technician may pull the ripcord during installation in order to access internal components of the cable 100.

Figure 2:
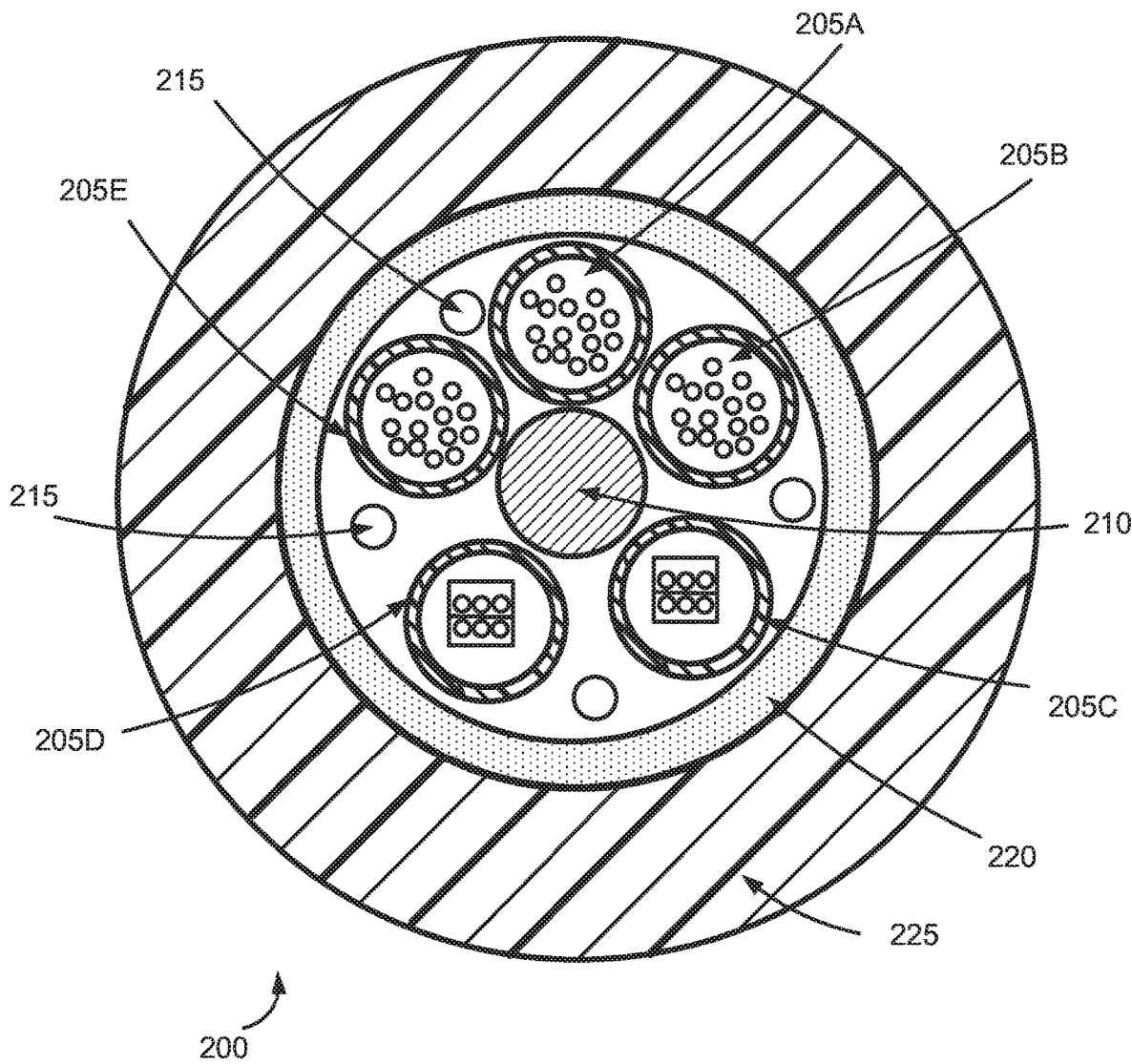
Figure 3:
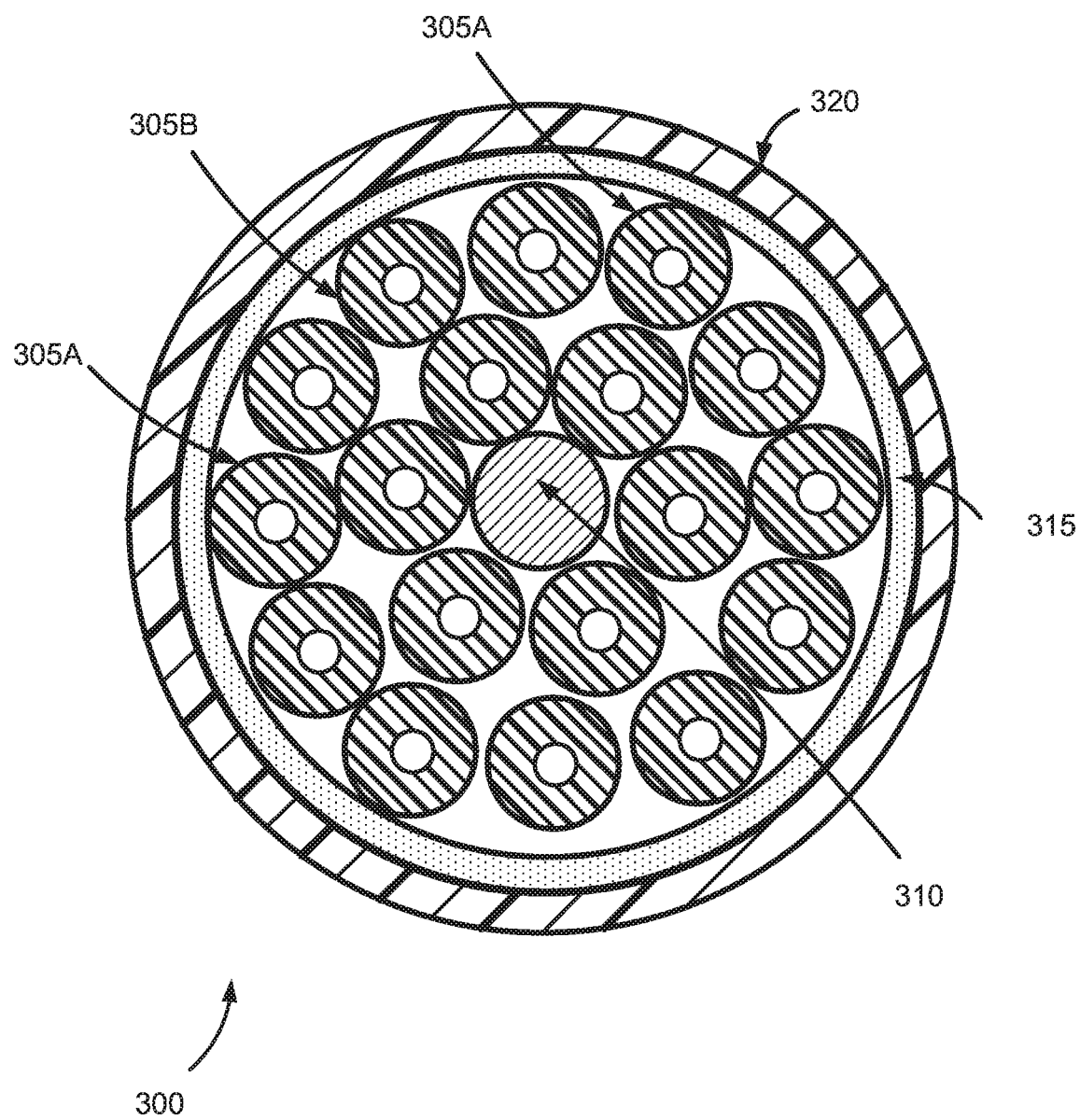

As desired, any number of strength members may be incorporated into the cable 100 at a wide variety of suitable locations. In certain embodiments, one or more strength members 125A, 125B may be embedded in the jacket 120. For example, the jacket 120 may be formed or extruded around one or more strength members 125A, 125B. Embedded strength members 125A, 125B may be located at any desired points within the jacket 120. For example, the strength members 125A, 125B may be located on opposing lateral sides of a longitudinal axis of the cable 100. The strength members 125A, 125B may enhance tensile strength of the cable 100. In other embodiments, one or more strength members may be situated within a cable core, as illustrated in FIGS. 2 and 3. Indeed, a wide variety of strength member configurations may be utilized.

In certain embodiments, the cable 100 may include an armor (not shown) inside or encompassed within the jacket 120. The armor may provide mechanical (e.g., rodent resistance, etc.) and/or electrical protection for transmission media situated within the cable core. The armor may be formed from a wide variety of suitable materials, such as a metal (e.g., steel, a copper alloy, etc.) tape that is formed into a tube, fiberglass, glass, epoxy, and/or appropriate polymeric materials. In certain embodiments, the armor may be formed as an interlocking armor or a corrugated armor. Additionally, an armor may be formed as a single layer armor or alternatively an armor may have multiple layers.

Figure 4:
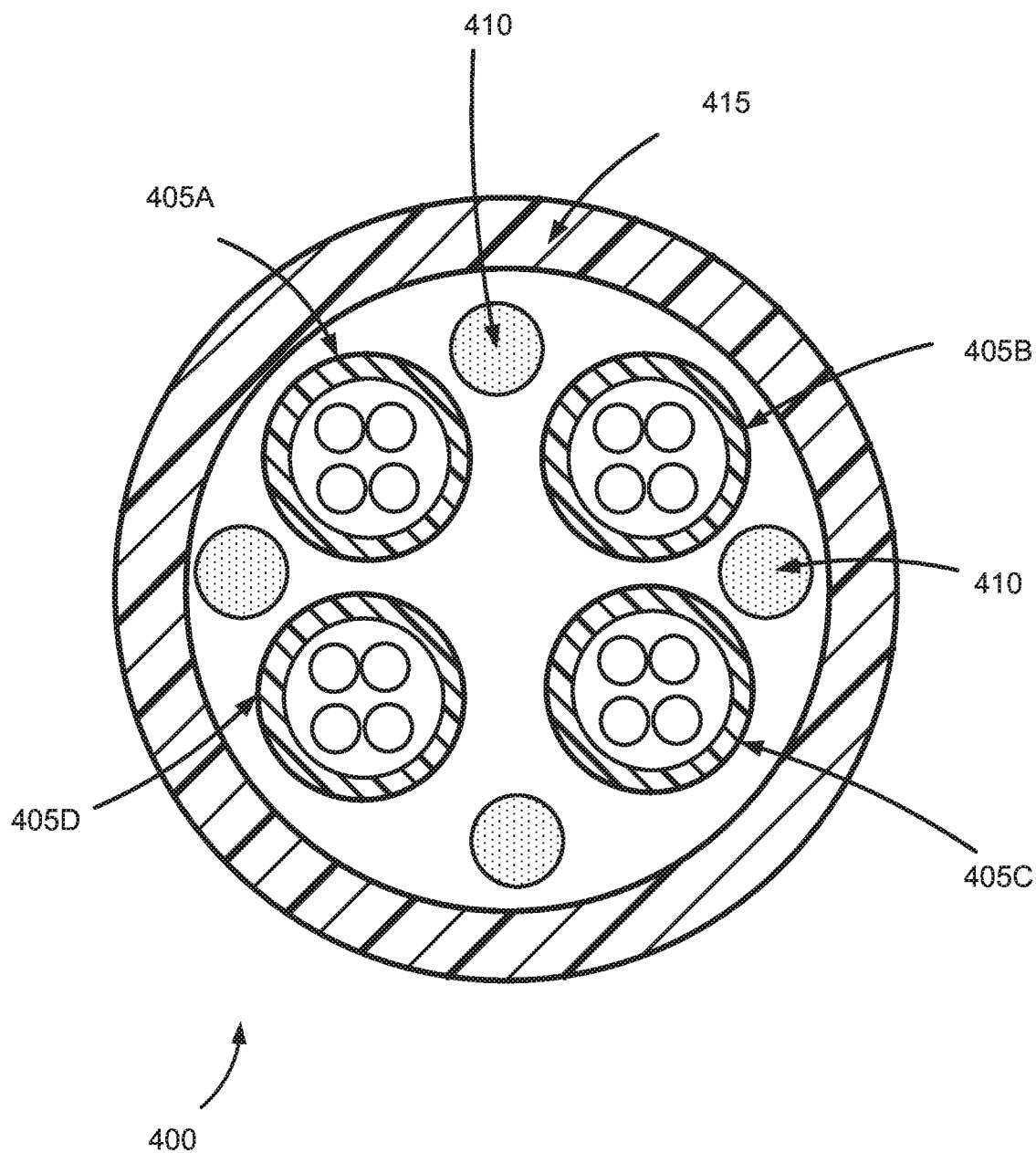

As desired, the cable 100 may also include water swellable materials or water dams for impeding flow of any water that inadvertently enters the cable 100, for example due to damage of the outer jacket 120. Upon contact with water, water swellable materials may absorb the water and swell, helping to prevent the water from damaging the optical fibers. Impeding the longitudinal flow of water also helps confine any fiber damage to facilitate repair. Accordingly, water dams may help to limit water damage. As shown in FIG. 1, a water swellable tape or wrap 115 may be positioned in a cable core and wrapped around one or more other cable components, such as the buffer tube 110. In other embodiments and as illustrated in FIGS. 2 and 4, one or more water swellable materials (e.g., water swellable yarns, etc.) may be positioned in interstices between core components, such as between one or more buffer tubes or between one or more buffer tubes and a cable jacket. In yet other embodiments, individual core components may be partially or completely wrapped with water swellable materials. As desired in various embodiments, water swellable materials may be provided in a continuous or discontinuous manner along a longitudinal length of the cable 100. Additionally or alternatively, water blocking material (e.g., water blocking dams) may be intermittently incorporated into the cable core. A wide variety of suitable water blocking materials and/or combinations of materials may be utilized as desired.

FIG. 2 is a cross-sectional view of another example cable 200 that may include one or more components formed from a polymeric material or polymeric resin filled with two-dimensional particles, according to an illustrative embodiment of the disclosure. The cable 200 of FIG. 2 may include certain components that are similar to the cable 100 of FIG. 1; however, the cable 200 of FIG. 2 may include a plurality of buffer tubes 205A-E rather than a single buffer tube. As shown, a plurality of buffer tubes 205A-E may be situated around a central strength member 210. Although five buffer tubes 205A-E are illustrated, any number of buffer tubes can be utilized. In other embodiments, the buffer tubes 205A-E may be situated around a central tube, a central group of twisted pairs, or other central cable component(s)). Additionally, although a single ring or layer of buffer tubes 205A-E is illustrated, multiple rings or concentric layers of buffer tubes may be utilized. As desired, one or more of the buffer tubes 205A-E may be replaced with other components, such as strength members or spacers. Indeed, a wide variety of suitable buffer tubes arrangements may be utilized.

Each of the buffer tubes 205A-E may be situated within a cable core. The buffer tubes 205A-E may be loosely positioned within the core or, alternatively, stranded or twisted together. Any number of transmission media, such as optical fibers, optical fiber ribbons, and/or twisted pairs, may be situated within one or more of the buffer tubes 205A-E. Each buffer tube may be filled or unfilled as desired. Additionally, in certain embodiments, one or more water blocking components, such as water blocking yarns 215 and/or a water blocking tape 220 or wrap may also be positioned within the cable core. An outer jacket 225 may then be formed around the internal cable components, and the outer jacket 225 may define the cable core (or multiple cores).

Each of the components illustrated in the cable 200 of FIG. 2 may be similar to the components previously described with reference to FIG. 1 above. Additionally, at least one of the buffer tubes 205A-E may be formed from one or more polymeric materials filled with two-dimensional particles. In other words, the buffer tube (generally referred to as buffer tube 205) may be a buffer layer formed from a polymeric resin that has been blended or combined with two-dimensional filler particles and one or more compatabilizers. As explained in greater detail below, various polymeric resins, filler materials, and/or compatabilizers may be used in the formation of the buffer tube 205.

FIG. 3 is a cross-sectional view of another example cable 300 that may include one or more buffer layers formed from a polymeric material or polymeric resin filled with two-dimensional particles, according to an illustrative embodiment of the disclosure. The cable 300 of FIG. 3 may include certain components that are similar to the cables 100, 200 of FIGS. 1 and 2; however, the cable 300 of FIG. 3 may include a plurality of tight-buffered optical fibers 305A, 305B, 305C, etc. rather than one or more buffer tubes in which optical fibers may be situated. As shown, a plurality of tight-buffered optical fibers, such as fibers 305A, 305B, 305C, may be situated around a central strength member 310. Any number of tight-buffered optical fibers may be incorporated into the cables as desired, and theses fibers may be arranged into any number of rings or groupings. As desired in other embodiments, the optical fibers may be situated around a central tube, a central group of twisted pairs, or other central cable component(s)). Additionally, in certain embodiments, a plurality of tight-buffered fibers may be stranded or twisted together within a cable core. In certain embodiments, one or more of the optical fibers may be replaced with other components, such as strength members, spacers, or buffer tubes. Indeed, a wide variety of suitable tight-buffered optical fiber arrangements may be utilized.

A tight-buffered optical fiber may be formed by applying or forming a cover, jacket, or buffer layer over an individual optical fiber. These buffer layers protect the fiber from physical damage and limit microbending of the fiber. A tight-buffer layer may be formed from any number of suitable materials and/or combinations of materials, such as a wide variety of polymeric materials. In certain embodiments, at least one tight-buffer layer may be formed from one or more polymeric materials filled with two-dimensional particles. In other words, the tight-buffer layer may be a buffer layer formed from a polymeric resin that has been blended or combined with two-dimensional filler particles and one or more compatabilizers. As explained in greater detail below, various polymeric resins, filler materials, and/ or compatabilizers may be used in the formation of the tight-buffer layer.

As desired, one or more water blocking components, such as water blocking yarns and/or a water blocking tape 315 or wrap may also be positioned within the cable core. An outer jacket 320 may then be formed around the internal cable components, and the outer jacket 320 may define the cable core (or multiple cores). Each of the components illustrated in the cable 300 of FIG. 3 may be similar to the components previously described with reference to FIGS. 1 and 2 above.

FIG. 4 is a cross-sectional view of another example cable 400 that may include one or more buffer layers formed from a polymeric material filler with two-dimensional particles, according to an illustrative embodiment of the disclosure. The cable 400 of FIG. 4 may include certain components that are similar to the cables 100, 200, 300 of FIGS. 1-3; however, the cable 400 of FIG. 4 may include a plurality of optical fiber microtubes rather than one or more buffer tubes and/or tight-buffered optical fibers. Any number of microtubes, such as the four illustrated microtubes 405A-D, may be situated within a cable core. As desired, the microtubes may be loosely positioned within a cable core; situated around a central strength member, tube, or other component; or stranded or twisted together within a cable core. Additionally, in certain embodiments, one or more of the microtubes may be replaced with other components, such as strength members, spacers, etc. Indeed, a wide variety of suitable microtube arrangements may be utilized.

Each microtube (generally referred to as microtube 405) may house any desired number of optical fibers, such as two, three, four, eight, twelve, or some other number of optical fibers. The microtube 405 may have a single layer or multi-layer construction, and the microtube 405 may be formed from any suitable material or combination of materials. In certain embodiments, one or more microtubes, such as microtube 405 (or at least one layer of the microtube 405), may be formed from one or more polymeric materials filled with two-dimensional particles. In other words, the microtube 405 may be a buffer layer formed from a polymeric resin that has been blended or combined with two-dimensional filler particles and one or more compatabilizers. As explained in greater detail below, various polymeric resins, filler materials, and/or compatabilizers may be used in the formation of the microtube 405. Additionally, as desired, a microtube 405 may have an inner diameter that is sized to allow the optical fibers to move relative to one another while preventing the optical fibers from crossing over or overlapping one another. In other words, the microtube 405 may permit the optical fibers to flex or move as the cable is flexed or bent while simultaneously maintaining the position of each optical fiber relative to the other optical fibers. In certain embodiments, an inner diameter of the microtube 405 may be determined based at least in part on the number of optical fibers to be positioned within the microtube 405 and/or the outer diameters of the optical fibers. As a result of using one or more microtubes 405, it may be possible to reduce or minimize the diameter of the cable 400 relative to cables that incorporate loose buffer tubes.

Additionally, in certain embodiments, one or more water blocking components, such as water blocking yarns 410 and/or a water blocking tape or wrap may also be positioned within the cable core. An outer jacket 415 may then be formed around the internal cable components, and the outer jacket 415 may define the cable core (or multiple cores). Each of the components illustrated in the cable 400 of FIG. 4 may be similar to the components previously described with reference to FIGS. 1-3 above.

Although FIGS. 1-4 illustrate optical fiber cables, embodiments of the disclosure are equally applicable to cables that incorporate other types of transmission media. For example, a cable may be formed as a hybrid cable that includes a combination of one or more optical fibers and one or more other transmission media, such as twisted pairs of individually insulated electrical conductors, coaxial conductors, power conductors, etc.

The cables 100, 200, 300, 400 illustrated in FIGS. 1-4 are provided by way of example only to illustrate a few cable constructions in which one or more buffer layers may be formed from a polymeric resin filled with two-dimensional particles. A wide variety of other components may be incorporated into a cable as desired in other embodiments. For example, various cables may include internal wraps or jackets, binding layers, a wide variety of suitable transmission media, a wide variety of different types of tubes, spacers, strength members, water blocking materials, water swellable materials, insulating materials, dielectric materials, flame retardants, flame suppressants or extinguishants, gels, filling compounds, and/or other materials. Additionally, a cable may be designed to satisfy any number of applicable cable standards. These standards may include various operating environment requirements (e.g., temperature requirements), signal performance requirements, burn testing requirements, etc.

In accordance with an aspect of the disclosure and regardless of the type of cable, at least one buffer layer of a cable may be formed at least in part from a polymeric resin that has been filled with two-dimensional particles. Examples of cable components that may be formed in such a manner include, but are not limited to, buffer tubes, tight-buffer layers, microtubes, etc. As explained in greater detail below, the addition of two-dimensional particles and one or more compatabilizers may enhance certain properties of the polymeric resin.

Figure 5A:
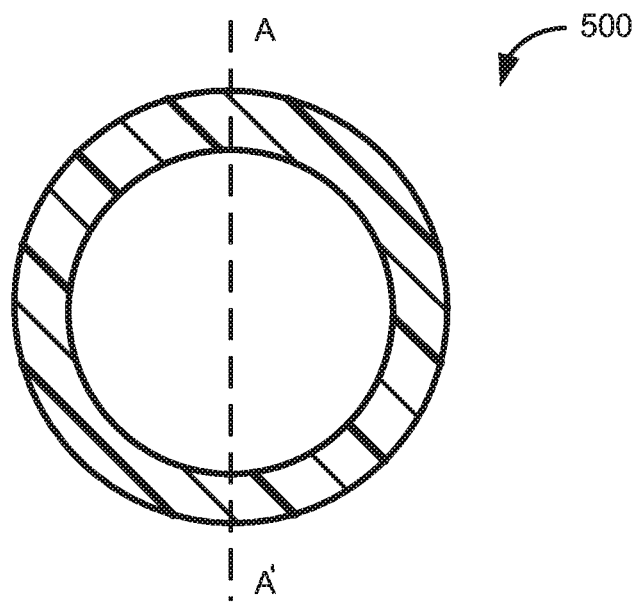
FIGS. 5A-5B are cross-sectional views of example buffer layers that may be formed at least in part from a polymeric material filled with two-dimensional particles, according to illustrative embodiments of the disclosure.
Figure 5B:
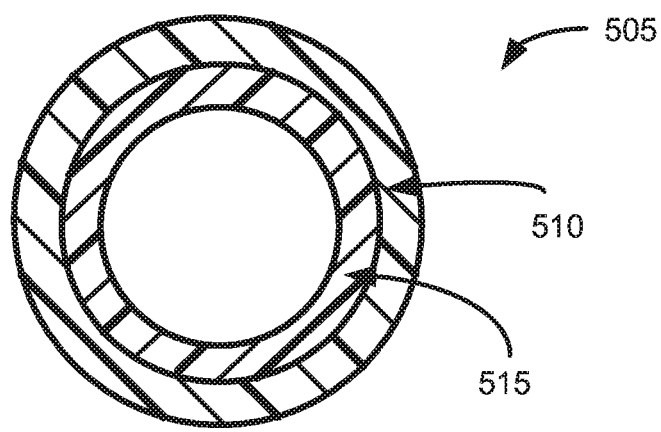
Figure 5C:
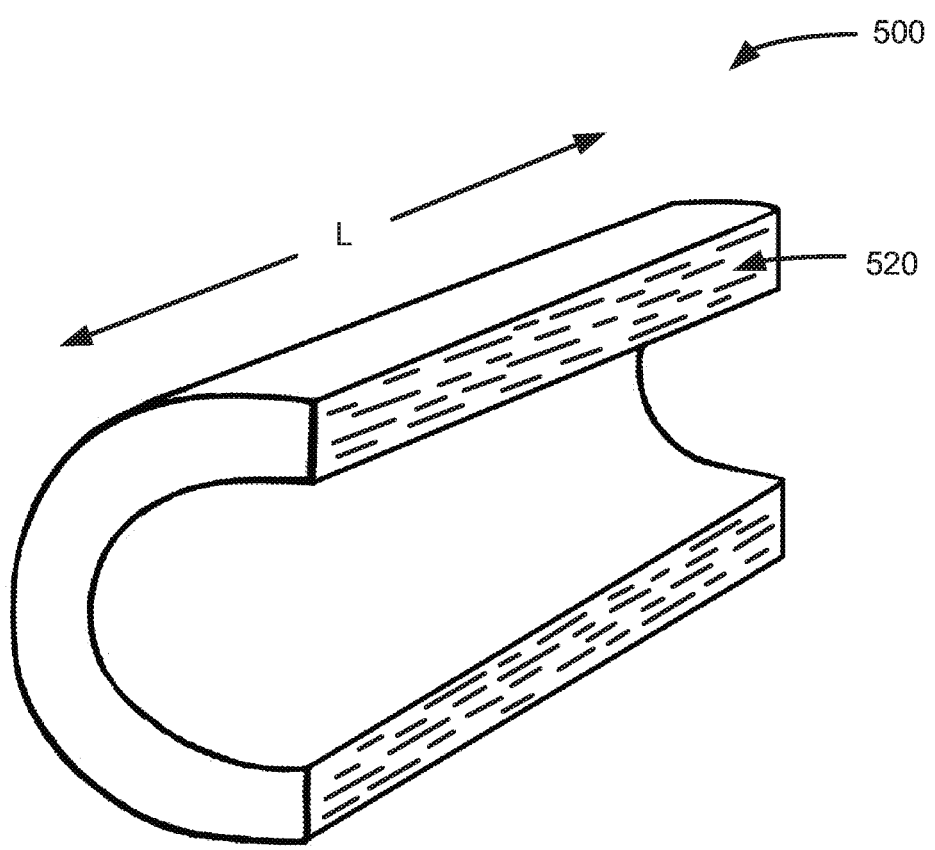
FIG. 5C is a perspective cross-sectional view of an example buffer layer that may be formed at least in part from a polymeric material filled with two-dimensional particles, according to an illustrative embodiment of the disclosure.

In certain embodiments, a buffer layer may be formed completely from a polymeric resin that has been filled with two-dimensional particles. In other embodiments, one or more portions of a buffer layer, such as one or more layers of a multi-layer structure, may be formed from a polymeric resin that has been filled with two-dimensional particles. FIGS. 5A-5B illustrate cross-sectional depictions of example buffer layers that are formed at least in part from a polymeric resin filled with two-dimensional particles. FIG. 5C then illustrates a perspective cross-sectional view of the buffer layer 500 taken along line A-A'. Each of these figures is described in greater detail below.

Turning first to FIG. 5A, an example buffer layer 500 (e.g., buffer tube, tight-buffer layer, etc.) that has been formed with a single layer is illustrated. In other words, the buffer layer 500 of FIG. 5A may be formed completely from a polymeric resin that has been combined with two-dimensional particles and compatabilizer. FIG. 5B illustrates an example buffer layer 505 that is formed with multiple component layers 510, 515. Although two component layers are illustrated, any number of layers may be utilized to form the buffer tube 505. Additionally, in certain embodiments, at least two of the layers may be formed from different materials. For example, a first layer may be formed from a polymeric resin combined with two-dimensional particles and compatabilizer. A second layer may then be formed from a different material or group of materials, such as an unfilled polymeric resin, a polymeric resin combined with different two-dimensional particles, a polymeric resin combined with different filler materials, a colored polymeric resin, etc.

FIG. 5C illustrates a perspective cross-sectional view of the buffer layer 500 of FIG. 5A taken along line A-A'. As shown in FIG. 5C, the buffer layer 500 may extend along a longitudinal direction "L". Additionally, a plurality of two-dimensional particles 520 may be dispersed within a polymeric resin or polymeric material(s) that are utilized to form the buffer layer 500. As shown, the two-dimensional particles may be orientated or highly oriented along the longitudinal direction "L". In other words, the longer dimensions of the two-dimensional particles "D" may be aligned or approximately aligned with the longitudinal direction "L". Additionally, as explained in greater detail blow, the two-dimensional particles may be intercalated and/or exfoliated within the polymeric resin. The buffer layers 500, 505 illustrated in FIGS. 5A-5C are provided by way of example only to illustrate a few example constructions that may incorporate a polymeric resin combined with two-dimensional particles. A wide variety of other example constructions may be utilized as desired, and the disclosure is not intended to be limited to the illustrated embodiments.

According to an aspect of the disclosure, at least one buffer layer incorporated into a cable, such as any of the cables 100, 200, 300, 400 of FIGS. 1-4, may include one or more layers (e.g., a single layer, a component layer, etc.) formed from a material that includes a polymeric resin, a filler added to the polymeric resin, and a compatabilizer combined with the polymeric resin and the filler. A wide variety of suitable polymeric resins may be utilized as desired, such as polypropylene ("PP"), a polypropylene copolymer (e.g., a copolymer of polypropylene and polyethylene ("PE"), etc.), or any suitable polyolefin resin or polyolefin-containing resin. Polymeric resins formed from PP and/or from a PP/PE copolymer may be less expensive than other polymeric resins traditionally used to form buffer layers, such as polybutylene terephthalate ("PBT"), polycarbonate ("PC"), and/or polyamides (e.g., Nylon, etc.).

In the event that a PP/PE copolymer is utilized, a wide variety of blending or mixing ratios between the PP and PE may be utilized. In certain embodiments, the copolymer may include approximately ninety percent (90%) by weight of PP and approximately ten percent (10%) by weight of PE. In various embodiments, the ratio of PP to PE may be approximately 99/1, 98/2, 95/5, 92/8, 90/10, 88/12, 85/15, 80/20, 75/25, 70/30, 60/40, or a ratio included in a range between any two of the above values.

Additionally, in certain embodiments, the polymeric resin may be a nucleated polymeric resin. A wide variety of suitable nucleating agents may be utilized as desired. Examples of suitable nucleating agents include, but are not limited to, sodium benzoate (e.g., MI.NA.08 sold by Adeka Palmarole SAS, etc.), hydroxyaluminum di(p-tert-butyl) benzoate (e.g., Sandostab 4030 sold by Clariant, etc.), N, N'-dicyclohexyl-2,6-naphthalene dicarboxamide (e.g., NJASTAR NU-100 sold by New Japan Chemical, etc.), 1,3:2,4-bis-O-(4-methylbenzylidene) sorbitol (e.g., GEL ALL MD sold by New Japan Chemical, Irgaclear DM sold by BASF, Millad 3940 sold by Milliken, etc.), 1,3:2,4-bis-O-(benzylidene) sorbitol (e.g., EC-1 sold by EC chemical, Irgaclear D sold by BASF, Millad 3905 sold by Milliken, etc.), 1,3:2,4-bis-O-(3,4-dimethylbenzylidene) sorbitol (e.g., Millad 3988 sold by Milliken, etc.), 1,3,5-tris [2, 2-dimethyl-propionylamino] benzene (e.g., Irgaclear XT 386 sold by Ciba, etc.), 2,2'-methylenebis(4,6-di-tert-butylphenyl) phosphate (e.g., Irgastab NA-11 sold by Ciba, ADK STAB NA-11 sold by ADEKA, etc.), trans-quinacridone, pimelic acid and calcium stearate mixture, suberic acid, and some undisclosed chemicals (e.g., HPN-68L, HPN-20E, Millad NX-800 sold by Milliken, ADK STAB NA-21 and NA-71 sold by ADEKA, MPM 1141 and MPM 2000 sold by MAYZO, etc.), etc., or combinations thereof. In certain embodiments, the two-dimensional particles may also assist in nucleating the polymeric resin.

According to an aspect of the disclosure, a plurality of two-dimensional particles may be blended into, combined with, or dispersed within the polymeric resin. A wide variety of suitable two-dimensional particles may be utilized as desired in various embodiments. Examples of two-dimensional particles include, but are not limited to, layered silicates (e.g., montmorllonite, hectorite, saponite, vermiculite, kaolinite, mica, talc, synthetic minerals, natural minerals, etc.), exfoliated silicate platelets, graphite oxide, double hydroxide (LDH) tactoids, metal oxide nanosheets, carbon nanowalls, etc.

As set forth above, the two-dimensional particles may each have a dimensional line "D" taken along a surface area that is much greater than a thickness "T". For example, the two-dimensional particles may be relatively long and/or wide particles relative to their thickness. The two-dimensional particles may have a wide variety of suitable dimensions, such as any suitable value for "D" or any suitable surface area. In certain embodiments, the two-dimensional particles may have dimensions with "D" values ranging from microns to nanometers. Additionally, when the two-dimensional particles are incorporated into a polymeric resin, the dimensions of the particles may change. For example, the particles may be exfoliated or broken into smaller particles.

Two-dimensional particles may be added as a filler to a polymeric resin in any suitable filling ratio and/or in any suitable amounts. For example, two-dimensional particles may be dispersed within a polymeric resin such that a buffer layer formed from the filled polymeric resin includes between approximately 0.01 percent and approximately 50 percent by weight of two-dimensional particles. In various embodiments, the two-dimensional particles may be used as a filler at approximately 0.01, 0.05, 0.1, 0.2, 0.25, 0.5, 0.75, 1.0, 1.5, 2.0, 2.5, 3.0, 4.0, 5.0, 7.5, 10, 12.5, 15, 20, 25, 30, 35, 40, or 50 percent by weight of a buffer layer, at a percentage incorporated into a range by any two of the above values, or at a percentage incorporated into a range bounded on either a minimum or maximum end by one of the above values. In certain embodiments, the two-dimensional particles may form between approximately 0.5 percent and approximately 5.0 percent by weight of a buffer layer.

In certain embodiments, the filler materials incorporated into a polymeric resin may be solely formed from two-dimensional particles. In other embodiments, the two-dimensional particles may be mixed or blended at any suitable ratio with one or more other filler materials or filler components including, but not limited to, components in the shape of tubes, components in the shape of fibers, components having spherical shapes, and/or components having cubical shapes. Examples of other filler components include, but are not limited to, carbon nanotubes, cellulose whiskers, boron nitride tubes, gold nanotubes, gold nanowires, silver nanotubes, two-dimensional graphene, graphene, black phosphorus, clay nanotubes, natural sepiolite clay fibers, cellulose fibers, nanotubes, sisal fibers, carbon fibers, silver, zinc oxide, titanium dioxide, silica dioxide, iron oxide, cerium dioxide, copper oxide, molybdenum disulfide, hexagonal boron nitride, graphene oxide, nanosilica, nanoalumina, nanotitanium oxide, polyhedral oligomeric silsesquioxane (POSS), nanomagnesium hydroxide, semiconductor nanoclusters, carbon black, silicon carbide, silica, quantum dots (QDs).

Other materials that can be added as desired include, but are not limited to, one or more flame retardant materials, one or more low smoke zero halogen ("LSZH") materials, one or more smoke suppressants, one or more antioxidants, one or more plasticizers, one or more reinforcing filler materials or strength materials, one or more ultraviolet ("UV") stabilizers, one or more moisture absorbing and/or water absorbing materials (e.g., absorbent powders, supabsorbent materials, etc.), one or more moisture blocking and/or water blocking materials, one or more slip agents, one or more materials that lower or reduce the coefficient of friction of a modified polymeric resin, one or more materials that reduce the coefficient of thermal expansion of a modified polymeric resin, one or more colarants and/or dies, one or more foaming agents, etc. Indeed, a wide variety of suitable formulations and/or recipes may be utilized to blend a polymeric resin that can be utilized to form one or more buffer layers.

A wide variety of suitable processes and/or methods may be utilized as desired to combine two-dimensional particles and/or other filler materials with a polymeric resin. In certain embodiments, additive materials may be combined or blended together in a Masterbatch, and the Masterbatch may be subsequently added to a polymeric resin. For example, the Masterbatch may be combined with a polymeric resin within a suitable extrusion device (e.g., a single screw extruder, a multi-screw extruder, a continuous mixer, a continuous kneader, etc.). In other embodiments, additive materials may be physically mixed or combined with a polymeric resin, and the combination may be pelletized or otherwise processed for subsequent extrusion. Regardless of the point in time and/or techniques utilized to combine additive materials with a polymeric resin, the mixing and/or extrusion process may facilitate dispersion of the two-dimensional particles and/or other additives within the polymeric resin.

Additionally, as illustrated in FIG. 5C, the extrusion process may facilitate orientation of the two-dimensional particles within the polymeric resin. The extrusion process may force or otherwise orient the two-dimensional particles into a desired direction corresponding to the longitudinal direction "L" of a buffer layer formed from the polymeric resin. In certain embodiments, the orientation of the two-dimensional particles may be defined by the order parameters:

$$S_1 = \frac{1}{2}(3 \sin^2 \alpha - 1);\text{ and}$$

$$S_2 = \frac{1}{2}(3 \cos^2 \beta - 1)$$

where $\alpha$ represents the angle between the sheet normal unit vector of the two-dimensional particles and the buffer tube axial direction (or extrusion machine direction "MD"), and where $\beta$ represents the angle between the sheet normal unit vector of the two-dimensional particles and the buffer tube radial direction. If both order parameters $S_1$, $S_2$ are equal to 1 ($\alpha=90$, $\beta=0$), then there will be perfect alignment of the two-dimensional particles with the MD around a buffer layer. If both order parameters $S_1$, $S_2$ are equal to $-0.5$, ($\alpha=0$, $\beta=90$), then the two-dimensional particles may be stacked up along a buffer layer. If both order parameters $S_1$, $S_2$ are equal to 0, then there would be no preferred orientation of the two-dimensional particles within the buffer tube. In various embodiments, the order parameters $S_1$, $S_2$ may each be between 0 and 1.0. It is preferable that the order parameters are each close to 1.0. For example, each of the order parameters $S_1$, $S_2$ may be at least 0.5, 0.55, 0.6, 0.65, 0.7, 0.75, 0.8, 0.85, 0.9, or 0.95 in various embodiments.

During an extrusion process, the arrangement and/or orientation of two-dimensional particles may be controlled or influenced by a wide variety of parameters including, but not limited to, tubing setup and process conditions (e.g., tip-die determined diameter draw ratio ("DDR"), water or cooling trough distance, extrusion die temperature, line speed, etc.), dimensions of the two-dimensional particles, amounts and types of compatabilizers, and/or the matrix of the polymeric resin. In certain embodiments, the setup of the extrusion die and tip may generate DDR between approximately 2 and approximately 20, such as DDR between approximately 10 and approximately 20. The tubing die temperature may be selected based upon the polymeric material that is extruded. For certain types of polypropylene, the tubing die temperature may be at least approximately 180° C., for example, between approximately 200° C. and approximately 250° C. A distance between a water trough and extrusion die may be more than 50 times the outer diameter of an extruded buffer layer, such as a distance of at least 10 mm in certain embodiments.

According to an aspect of the disclosure, one or more compatabilizers may additionally be included within a buffer element. For example, one or more functional compatabilizers may be utilized to improve the affinity between the surface of the two-dimensional filler material(s) and the polymeric resin. The compatabilizers may assist in intercalating and/or exfoliating layered two-dimensional particles incorporated into a polymeric resin. In other words, the compatabilizers may facilitate breaking apart of multi-layer particles into smaller two-dimensional particles. The compatabilizers may also facilitate dispersion of the two-dimensional particles within a polymeric matrix of the polymeric resin and improve interfacing between the two-dimensional particles and the polymeric resin. A wide variety of suitable compatabilizers and/or combinations of compatabilizers may be utilized as desired in various embodiments. Suitable compatabilizers include amphiphilic or amphipathic compatabilizers, such as polypropylene-grafted maleic anhydride ("PP-g-MA"), polyethylene-grafted maleic anhydride ("PE-g-MA"), and/or compatabilizers that may chemically functionalize a polymer matrix with polar groups or segments on the polymer chains.

Examples of suitable compatabilizers include, but are not limited to, polypropylene modified by maleic anhydride (e.g., Sanyo PPMA sold by Sanyo Chemical Industries, Ltd.), functionalized polypropylene (e.g., PPOH, etc.), Hoeschst Hostaprime, Eastman Epolene® (e.g., low molecular weight PE, low molecular weight PP, etc.) sold by the Eastman Chemical Company, Eastman G particles that include maleic anhydride grafted PP or other polymers (e.g., Eastman G-3015, Eastman G-3003, etc. sold by the Eastman Chemical Company), Chemtura or Crompton-Uniroyal Chemical Polybond™ materials (e.g., Polybond 300, Polybond 3150, chemically modified polyolefins, etc.), DuPont Dow Fusabond® materials (e.g., Fusabond A560, E100, E158, E226, E265, E528, M603, N493, N525, N598, etc.) sold by the DuPont Company, Exxonmobil Exxelor™ PO materials (e.g., Exxelor PO 1020, etc.) sold by Exxonmobil, Linxidan® LX materials (e.g., Linxidan LX4433, LX4435, LX4436, LX4510, LX4520, LX4530, etc.) sold by Sacio AEI Polymers, Kraton™ FG materials sold by the Kraton Corporation, Integrate™ functionalized polyolefins sold by LyondellBassell, etc.

Additionally, one or more compatabilizers may be added to a polymeric resin in any suitable filling ratio. For example, compatabilizer may be incorporated into a buffer layer between approximately 0.01 percent and approximately 80 percent by weight. In various embodiments, compatabilizer may be incorporated at approximately 0.01, 0.05, 0.1, 0.2, 0.25, 0.5, 0.75, 1.0, 1.5, 2.0, 2.5, 3.0, 4.0, 5.0, 7.5, 10, 12.5, 15, 20, 25, 30, 35, 40, 50, 60, 70, 75, or 80 percent by weight of a buffer layer, at a percentage incorporated into a range by any two of the above values, or at a percentage incorporated into a range bounded on either a minimum or maximum end by one of the above values. In certain embodiments, the compatabilizer may form between approximately 0.5 percent and approximately 10.0 percent by weight of a buffer layer.

Additionally, any suitable weight ratio may be utilized between two-dimensional filler particles and the compatabilizer, such as a ratio of 0.01 to 10,000, 0.1 to 5,000, 0.1 to 1,000, 0.1 to 500, 0.1 to 100, 0.1 to 50, 0.1 to 10, 1 to 10, 1 to 5, or any ratio included in a range between any two of the above ratios. In certain embodiments, at least two or at least three times as much compatabilizer may be incorporated into a buffer layer by weight as compared to the two-dimensional filler particles.

In certain embodiments, the two-dimensional particles may be dispersed within a polymeric resin. The dispersion may be facilitated by the mixing of the particles within the polymeric resin, by the extrusion process and/or with the use of compatabilizer. Several example buffer layers with dispersed two-dimensional particles were formed. In a first example buffer layer, the two dimensional particles were formed form a first silicate material having an interlayer distance of approximately 3.15 nm determined by using X-ray diffraction analysis. When incorporated into a buffer layer, the determined interlayer distance of the two-dimensional particles within the polymeric resin was approximately 3.38 nm. Similarly, a second example buffer layer was produced with two dimensional particles formed from a second silicate material having an interlayer distance of approximately 2.75 nm. When incorporated into the second buffer layer, the interlayer distance of the two-dimensional particles within the polymeric resin was approximately 3.30 nm. Both of these examples show that the two-dimensional particles may be intercalated, exfoliated, and/or fractured into smaller tactoids or intercalants within a polymeric matrix.

It has been found that the use of compatabilizer assists with the intercalation and/or dispersion of two-dimensional particles within a polymeric resin. By contrast, the use of surface treatments as described in U.S. Pat. No. 6,430,344 was not found to be efficient in adequately exfoliating and dispersing filler particles within a polymeric resin. Particularly, clay filler particles were not found to be adequately exfoliated and dispersed in polyolefin matrices that do not have any polar functional groups or segment chains, when only surface treatment was utilized. Thus, the functionality of the filler particles was limited due to their aggregation and/or unstable dispersion, and the filler particles acted in similar manner to conventional fillers.

As a result of incorporating two-dimensional particles into a buffer layer (e.g., buffer tube, tight-buffer layer, etc.), the physical and/or mechanical properties of the buffer layer may be improved. For example, the buffer layer may exhibit reduced post-extrusion shrinkage and may have improved compression, tension, and/or crush resistance. In particular, the addition of two-dimensional particles may improve the flexural modulus and/or the yield strength of a buffer layer. As a result, the buffer layer may facilitate improved excess fiber length ("EFL") control. Example properties for buffer layers formed with two-dimensional filler particles are set forth in Tables 1 and 2 below:

TABLE 1

Flexural Modulus of Example Buffer Layers

| Buffer Layer Material | Flexural Modulus with Hot-Press Process | Flexural Modulus with Extrusion Process that Orients Filler Particles |
| --- | --- | --- |
| PP | 1210 MPa | 1230 MPa |
| PP with first Silicate Filler | 1460 MPa | 1580 MPa |
| PP with second Silicate Filler | 1320 MPa | 1600 MPa |

TABLE 2

Post Extrusion Shrinkage of Example Buffer Layers

| Buffer Layer Material | Post Extrusion Shrinkage for White Layer | Post Extrusion Shrinkage for Blue Layer |
| --- | --- | --- |
| PP | 0.70% | 0.60% |
| PP with first Silicate Filler | 0.07% | 0.18% |
| PP with second Silicate Filler | 0.14% | 0.10% |

As shown, buffer layers formed from polymeric resin that incorporates two-dimensional filler particles have a higher flexural modulus than buffer layers formed from unfilled polymeric resin. Additionally, the flexural modulus can be further improved by orienting the two-dimensional particles along the longitudinal direction of the buffer layer.

In order to measure post extrusion shrinkage, example buffer tubes were cut to 5.0 m lengths. The samples were then placed in a hot-air circulating dry oven equilibrated at 85° C. for at least 15 minutes. The tubes were then allowed to cool to room temperature, and the shrink back length of the samples was measured. The post extrusion shrinkage was then calculated as a ratio of the shrink back length to the initial 5.0 m length. As shown in Table 2, the presence of oriented two-dimensional particles significantly reduced post extrusion shrinkage.

The addition of two-dimensional particles may also improve the ability to process and extrude certain polymeric materials (e.g., PP, PE, PP-PE copolymer, etc.), thereby allowing enhanced operating line speeds. Additionally, the compatabilizer may facilitate improved dispersion and/or bonding of the two-dimensional particles within a polymeric resin, further enhancing the benefits of the two-dimensional particles.

Figure 6:
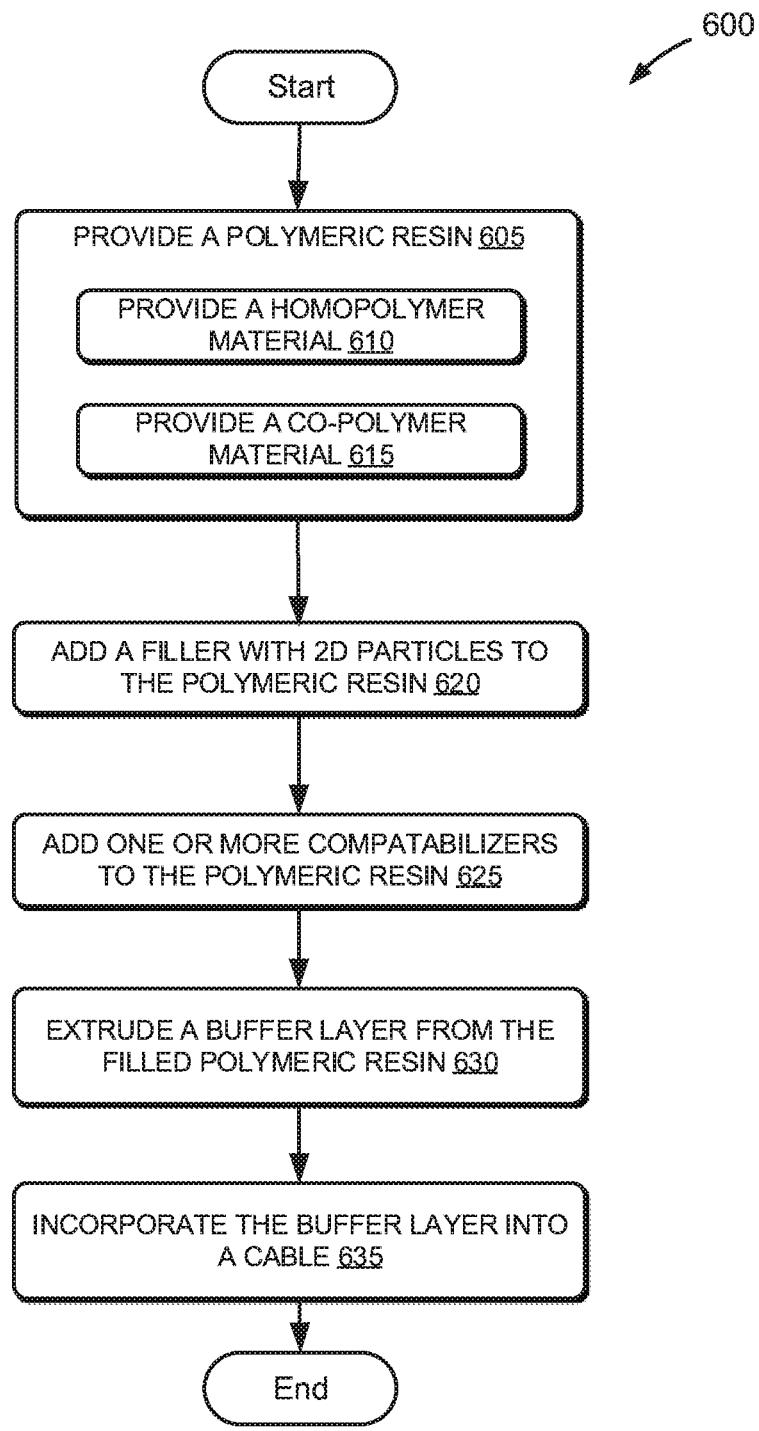
FIG. 6 is a flowchart of an example method for forming a buffer layer from a polymeric material filled with two-dimensional particles, according to an illustrative embodiment of the disclosure.

FIG. 6 is a flowchart of an example method 600 for forming a buffer layer from a polymeric material or resin and a plurality of two-dimensional filler particles, according to an illustrative embodiment of the disclosure. The method 600 may begin at block 605. At block 605, a polymeric resin or base material may be formulated or otherwise provided. A wide variety of suitable polymeric resins may be provided as desired in various embodiments. For example, at block 610, a polymeric resin formed from a homopolymer, such as a PP homopolymer, may be provided. As another example, at block 615, a polymeric resin formed from a copolymer (e.g., a copolymer of PP and PE, etc.) may be provided. Other suitable polymeric resins, such as resins formed from suitable polyolefin materials, may be utilized in other embodiments.

At block 620, a plurality of two-dimensional particles may be added to the polymeric resin. Additionally, at block 625, one or more suitable compatabilizers may be added to the polymeric resin. As set forth in greater detail above, a wide variety of suitable two-dimensional particles and/or compatabilizers may be utilized. One or more additional filler materials may also be added as desired. The two-dimensional particles and compatabilizers may be added in any suitable amounts and/or at any suitable ratios as described in greater detail above.

At block 630, a buffer layer may be formed from the filled or modified polymeric resin. For example, the filled polymeric resin may be extruded via any number of suitable extrusion devices and/or equipment (e.g., a single screw extruder, a multi-screw extruder, a continuous mixer, a continuous kneader, one or more extrusion cross-heads, etc.) in order to form a buffer layer. Additionally, a wide variety of suitable buffer layers may be formed from the filled polymeric resin as desired in various embodiments including, but not limited to, buffer tubes, tight-buffer layers, microtubes, etc. The compatabilizers may facilitate exfoliation or breakdown of the two-dimensional particles and dispersion of the two-dimensional particles within the polymeric resin. Additionally, during extrusion, the two-dimensional particles may be orientated in the extrusion direction or the longitudinal direction of the extruded buffer layer.

At block 635, the formed buffer layer may be incorporated into a cable. In certain embodiments, the buffer layer may be formed in an offline process prior to the construction of the cable, and the buffer layer may subsequently be incorporated into the cable. In other embodiments, the buffer layer may be formed in an inline process during the construction of the cable. As one non-limiting example, a buffer tube may be extruded around one or more optical fibers, optionally combined with other internal cable components, and then encapsulated within an outer jacket during a cable formation process.

The method 600 may end following block 635. The operations described and shown in the method 600 of FIG. 6 may be carried out or performed in any suitable order as desired in various embodiments. Additionally, in certain embodiments, at least a portion of the operations may be carried out in parallel. Furthermore, in certain embodiments, less than or more than the operations described in FIG. 6 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

That which is claimed:

1. A cable comprising:
   at least one optical fiber; and
   a buffer element formed around the at least one optical fiber, the buffer element formed from a material comprising:
      a polymeric resin comprising polypropylene;
      a filler added to the polymeric resin and comprising a plurality of two-dimensional particles oriented in a longitudinal direction of the buffer element; and
      an amphiphilic compatabilizer combined with the polymeric resin and the filler; and
   a jacket formed around the at least one optical fiber and the buffer element.

2. The cable of claim 1, wherein the filler comprises between 0.1 percent and 10.0 percent by weight of the material.

3. The cable of claim 1, wherein the filler comprises at least one of (i) layered silicates (ii) exfoliated silicate platelets, (iii) nanographene platelets, (iv) graphite oxide, (v) double hydroxide tactoids, (vi) metal oxide nanosheets, or (vii) carbon nanowalls.

4. The cable of claim 1, wherein the two-dimensional particles comprise layered particles.

5. The cable of claim 1, wherein the filler comprises a first filler, and wherein the material further comprises a second filler comprising at least one of (i) components in the shape of tubes or (ii) components in the shape of fibers.

6. The cable of claim 1, wherein the compatabilizer comprises between 0.1 percent and 20.0 percent by weight of the material.

7. The cable of claim 1, wherein the compatabilizer comprises one of (i) polypropylene grafted maleic anhydride or (ii) polyethylene grafted maleic anhydride.

8. The cable of claim 1, wherein the polymeric resin comprises a co-polymer of polypropylene and polyethylene.

9. The cable of claim 1, wherein the polymeric resin comprises nucleated polypropylene.

10. The cable of claim 1, wherein the buffer element comprises one of (i) a tight-buffer layer or (ii) a loose buffer tube.

\* \* \* \* \*